Oct. 19, 1954 E. B. PIERCE 2,692,096
APPARATUS FOR TRANSPORTING PERSONNEL AND EQUIPMENT
Filed Aug. 6, 1951 2 Sheets-Sheet 2

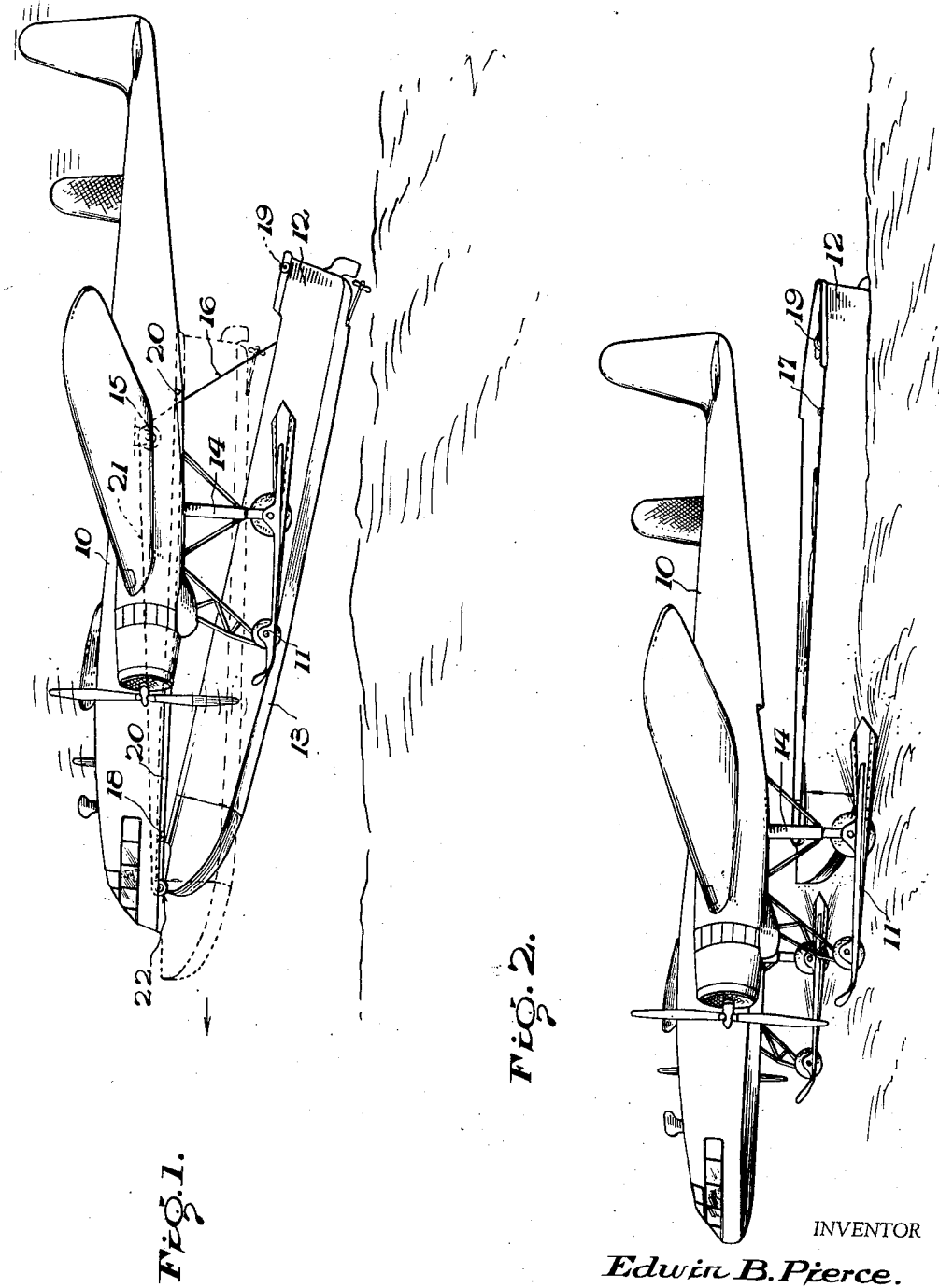

INVENTOR
Edwin B. Pierce.
BY Herbert M. Birch
ATTORNEY

Patented Oct. 19, 1954

2,692,096

UNITED STATES PATENT OFFICE 2,692,096

APPARATUS FOR TRANSPORTING PERSONNEL AND EQUIPMENT

Edwin B. Pierce, New Castle, Del., assignor, by mesne assignments, to All American Engineering Company, Wilmington, Del., a corporation of Delaware Application August 6, 1951, Serial No. 240,465

2 Claims. (Cl. 244—101)

The present invention relates to a novel means and method of air transportation and delivery of personnel and equipment by air from water to land and particularly to the use of aircraft for such transportation and delivery utilizing landing gear having hydro-planing surface members generally illustrated and described in prior copending application, Serial Number 142,654, filed February 6, 1950, now Patent No. 2,647,709 for Planing Surfaces for Aircraft and Hydrocraft.

In practicing the present invention aircraft made with special under fuselage construction for carrying water-tight cargo or landing barge pods are used. Such barge pods are straddled by the hydro-planing surface landing gear and serve as landing barges.

These cargo pods or barges have their own motive power. The barges when energized to provide forward driving power after a planing surface aircraft has landed on the water surface and reduced to forward taxiing speed may be released by the pilot from the aircraft fuselage and then be driven to land under their own power. The delivering hydro-planing aircraft without stopping its forward landing speed may after release of the self-powered barge or cargo pod immediately take-off for pick-up and delivery of another such pod.

With the present development the problem of water landing to a beach where reefs are a hazard is substantially eliminated since an aircraft equipped with hydro-planing surfaces can taxi over the reefs. Prior art devices combining air plane and boats cannot land in such hazardous places.

Accordingly, an object of this invention is to provide a very rapid delivery of cargo, troops and the like for landing operations from large floating air bases or from outlying land bases regardless of shallow water, reefs or other hazards.

Another object is to provide an aircraft equipped for landing on water whether it be the open sea or inland lakes, with a special form of barge adapted to be detachably mounted on the under part of the aircraft.

A further object is to provide for greater safety for aircraft utilizing normally non-water sustained hydro-planing surface landing members, by the addition of a detachably buoyant barge pod adapted to take over support of the aircraft if the motor of the aircraft should fail and the necessary sustaining forward taxiing speed should thereby cease to sustain the aircraft.

With these and other objects in view which will become apparent as the invention is fully understood, the same resides in the novel method and novelty of construction, combination and arrangement of elements and method steps hereinafter described and summarized in the appended claims.

The description should be read with reference to the accompanying drawings, wherein:

Figure 1 is a side view in elevation of an aircraft represented as being in flight with a barge pod being released from its connected position under the craft's fuselage and showing one of the water planing surfaces, which normally is extended below the bottom of the pod prior to release.

Figure 2 is a view of the aircraft on the water surface with the cargo pod released from the craft and floating independently on the water surface.

The apparatus

Figure 3:
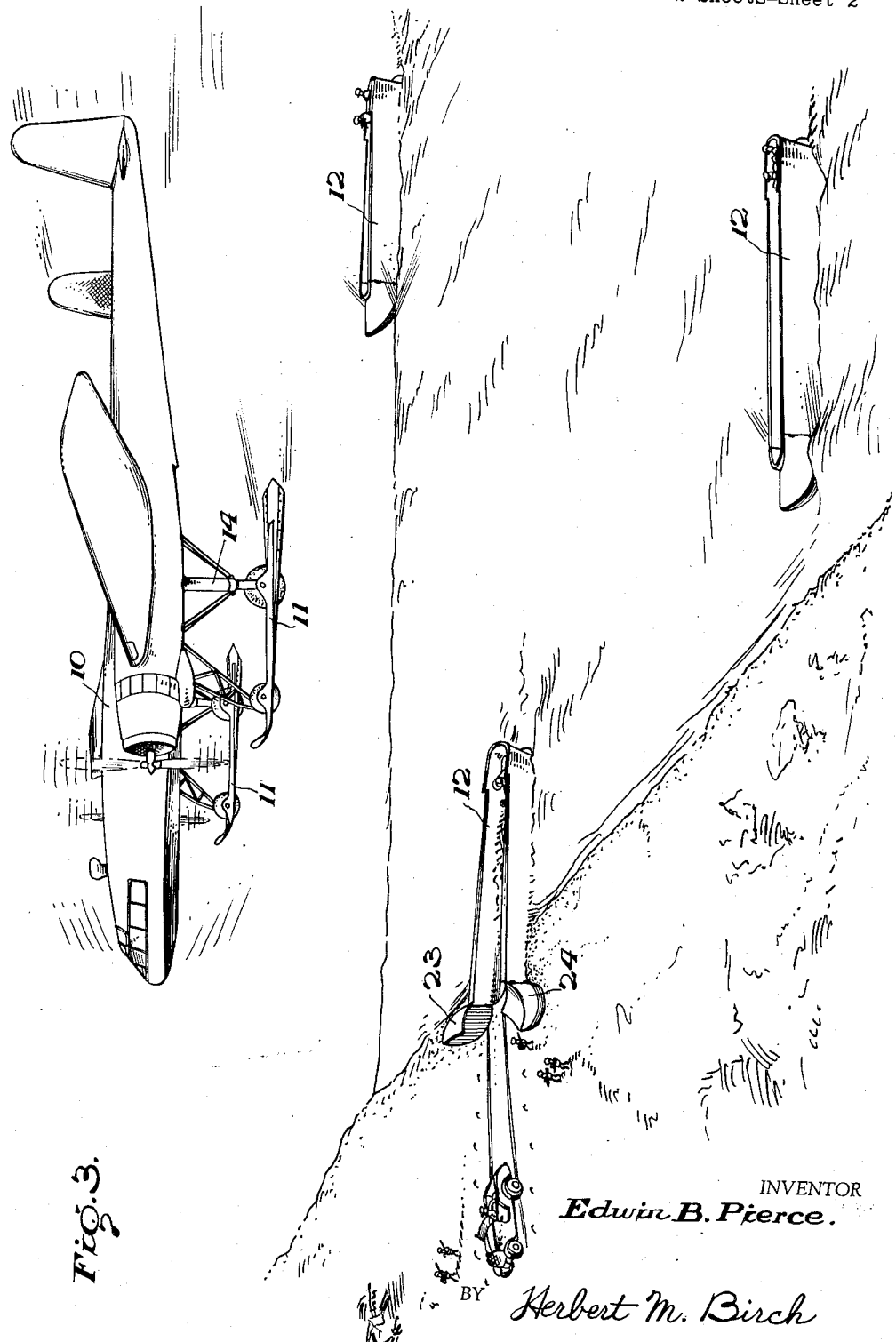
Fig. 3 is a general schematic view showing an aircraft in the air after having released its barge pod and showing several other barge pods making landings under their own power.

Referring in detail to the drawings and first with particular reference to Figures 1 and 2, there is shown an aircraft 10 in flight equipped with variable area planing surface landing gear 11 and a landing barge pod 12. The pod 12 when attached to the under part or belly of the aircraft fuselage is maintained with its bottom 13 above the planing surfaces of the landing gear and between the gear struts 14. Any suitable means for detachably connecting the barge pods to the aircraft belly may be provided, such as a stern winch 15 supported inside the fuselage with a raising and lowering cable 16, which connects to a hook eye 17 formed from a bolt extending from the rear of the landing barge pod. Rollers 18 at the bow and 19 at the stern of the landing barge pod ride along a track 20 as the stern is lowered to the water surface by the stern winch and cable. The track 20 extends longitudinally under the fore and aft axis of the fuselage and is free at each end to permit the bow roller 18 to roll off the track at the after end and the barge pod is thus released into the water.

Any suitable pilot control system for powering the winch 15 and cable 16 may be used and an additional cable connection 21 from a relatively smaller bow winch 22 connecting with a hook eye at the bow may be provided for picking up a landing barge pod. For example, to pick-up the landing barge pod 12 the steps are reversed by raising the bow by the stern winch 15 and placing the rollers 18 and 19 on the track. Then the bow winch 22 and its cable 21 pulls the pod forward and into transportation position under the fuselage. Each barge pod 12 has a bow made with outwardly swinging gates 23 and 24, see Figure 3, to facilitate rapid landing of vehicles and personnel.

*The method and operation*

In practicing the invention only aircraft equipped with variable planing surface landing members are used. These craft may land or launch to or from dirt, grass, mud, swampy ground or water. Thus the landing barge pods may be loaded from any surface. Usually the surface will be water although the pods may be loaded and picked up directly from land. Thus there is provided the method of air transportation of men and equipment comprising picking up and securing a self-powered landing barge pod to the belly of an aircraft between planing surface landing gear members, launching from a surface for flight with said pod and flying the same to a destination having a water surface to land upon, planing over the water surface at sustaining speed at said destination, releasing the said pod from the aircraft while so planing over the water surface, driving the said pod forward through the water to land, and launching the aircraft from the water without stopping the motion of the aircraft during the entire maneuver.

The steps of the present inventive novel method have been set forth in detail and although only one embodiment of an apparatus used, to practice the invention, has been illustrated and described in detail, it is to be expressly understood that various changes in the number of method steps, and the arrangement, combination and construction of the parts may now be made by others skilled in the art without departing from the invention. For a definition of the limits of the invention reference should be had to the appended claims.

What is claimed is:

1. An aircraft having a fuselage and spaced apart landing struts having planing surface members, a track extending longitudinally along the fore and aft axis of the fuselage between the struts, a detachable landing barge pod having bow and stern rollers engageable with the track with the bottom thereof above the plane of said planing surface members, and winch and cable means supported in the aircraft connected to the said pod for lowering the pod to the water between the planing surface members to release the same from the fuselage while the aircraft is planing forward over the water surface.

2. An aircraft having a fuselage and spaced apart landing struts having planing surface members, a track extending longitudinally along the fore and aft axis of the fuselage between the struts, a detachable landing barge pod having bow and stern rollers engageable with the track with the bottom thereof above the plane of the said planing surface members, a stern winch and cable and a bow winch and cable supported at the fore and aft ends of the track connected to the bow and stern of the said pod for causing the rollers to ride over the track to raise or lower the pod with respect to a water landing surface while the aircraft is planing forward at sustaining speed.

References Cited in the file of this patent

UNITED STATES PATENTS

| Number | Name | Date |
|---|---|---|
| 1,797,713 | Brogelli | Mar. 24, 1931 |
| 1,825,592 | Johnson | Sept. 29, 1931 |
| 2,352,323 | Hooker | June 27, 1944 |
| 2,468,009 | Bigley et al. | Apr. 19, 1949 |
| 2,472,947 | Hlobil | June 14, 1949 |

FOREIGN PATENTS

| Number | Country | Date |
|---|---|---|
| 575,532 | Great Britain | Feb. 21, 1946 |